(12) United States Patent
Zhu et al.

(10) Patent No.: US 6,431,203 B1
(45) Date of Patent: Aug. 13, 2002

(54) ACTUATOR MOUNTING ASSEMBLY

(75) Inventors: Hexiang Zhu, Plymouth; Robert C. Knutson, Minnetonka, both of MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/240,819

(22) Filed: Feb. 1, 1999

(51) Int. Cl.[7] .......................... F16K 31/04; F16K 51/00
(52) U.S. Cl. ............... 137/315.01; 137/15.18; 137/315.03; 137/343; 248/223.41; 248/309.1; 251/129.11; 251/292
(58) Field of Search .................. 137/15.18, 315.03, 137/15.17, 343, 315.17, 315.01; 251/129.11, 129.12, 129.13, 291, 292; 248/200, 205.1, 220.21, 223.41, 309.1

(56) References Cited

U.S. PATENT DOCUMENTS

| | | | | |
|---|---|---|---|---|
| 4,181,288 A | * | 1/1980 | Bylsma | 251/129.11 |
| 4,193,541 A | * | 3/1980 | Scheidweiler | 251/129.11 |
| 4,231,389 A | * | 11/1980 | Still et al. | 251/291 |
| 4,629,157 A | * | 12/1986 | Tsuchiya et al. | 251/292 |
| 4,633,897 A | * | 1/1987 | Effenberger | 251/292 |
| 4,891,921 A | | 1/1990 | Governale | 52/207 |
| 4,917,143 A | * | 4/1990 | Grooms | 137/343 |
| 5,377,951 A | | 1/1995 | Johnson et al. | 248/639 |
| 5,529,282 A | * | 6/1996 | Lebkuchner | 251/129.12 |
| 5,592,202 A | | 1/1997 | Erickson | 347/37 |
| 5,605,129 A | * | 2/1997 | Strombeck et al. | 251/129.11 |
| 5,785,288 A | | 7/1998 | West | 248/220.41 |
| 6,007,047 A | * | 12/1999 | Phipps | 251/291 |

* cited by examiner

Primary Examiner—George L. Walton

(57) ABSTRACT

An actuator mounting device for mounting an actuator having an actuator housing to a support structure associated with a fluid flow control unit. The actuator mounting device includes a mounting bracket and a pair of guide members. The mounting bracket includes a pair of spaced side walls, a rail extending from each side wall, and a stop. The pair of spaced side walls define a leading end and a trailing end. Further, each of the side walls has a base portion securable to the support structure. Finally, the stop is positioned at the trailing end of the spaced side walls. The pair of guide members are each configured to be mountable to an opposing side of the actuator housing and each include an engagement surface configured to slidably engage one of said rails. During assembly of the actuator to the support structure, the rails direct the guide members to a secured position at which the actuator housing is connected to the stop.

19 Claims, 4 Drawing Sheets

ACTUATOR MOUNTING ASSEMBLY

BACKGROUND OF THE INVENTION

The present invention relates to a device for mounting an actuator. More particularly, it relates to a mounting device for facilitating rapid mounting of a direct coupled actuator used in conjunction with an air flow control device.

Electromechanical actuators, and in particular direct coupled actuators, have a wide variety of applications. Generally speaking, actuators receive a control signal and mechanically reposition a final control element in response to that control signal. For example, in the heating, ventilating and air conditioning (HVAC) industry, an actuator is commonly used to control positioning of a damper or other similar air flow control unit in response to a signaling device, such as a thermostat. The damper may be used to control building air flow, rooftop exhaust fans, supply fans, variable air volume equipment, internal exhaust systems, cooling towers, combustion air inlets for boilers or furnace rooms, steam, hot water or chilled water lines, to name but a few applications.

Regardless of the specific application, the damper (or similar air flow control unit) generally includes a damper blade linked to an output shaft. Movement of the output shaft dictates a position of the damper blade. Positioning of the damper blade, in turn, determines the volume, if any, of air flow through duct work or other structures associated with the damper blade. For example, rotation of the output shaft will cause the damper blade to move between an open position and a closed position. The actuator causes the desired movement by imparting a rotational (or moment) torque onto the output shaft which in turn applies a force onto the damper blade. The actuator itself is seldom an integral component of the damper. Instead, actuators with various types of power supplies and control inputs are available. Depending upon the particular application, an appropriate actuator is selected and installed.

In general terms, a damper control actuator includes an electronically controlled drive mechanism designed to maneuver the damper output shaft between an open and closed position. To this end, conventional (or foot mounted) actuators require the use of a rod-type linkage connected between the actuator drive and the output shaft. Recently, direct coupled actuators have been developed. Direct coupled actuators are typically installed directly on the damper output shaft, eliminating the need for an auxiliary linkage assembly. With this in mind, a direct coupled actuator normally includes an actuator housing maintaining a rotatable hub and a motor. The hub is sized to be mounted to the damper output shaft. The motor, in turn, is associated with the hub, imparting a torque or moment load on the hub, and thus on the output shaft.

During installation, the hub is mounted to the output shaft. The actuator housing, in turn, is then secured to a rigid support structure associated with the damper being controlled. For example, the actuator housing may be connected to duct work or a frame directly associated with the damper in question. Alternatively, the actuator housing may be mounted to any nearby support structure, including auxiliary ducts or frames, building ceilings or floors, furnace housing, cooling tower chassis, etc. Attachment of the actuator housing to a rigid support structure provides a resistance to the moment load generated by the motor. Normally, however, the output shaft is connected by additional linkages to the damper blade and operates such that the output shaft does not subject the actuator itself to any significant forces. In other words, the actuator is not required to support or provide a bearing position for the output shaft. The output shaft effectively isolates the actuator from any forces normal to the actuator housing. Thus, a single bolt securing the actuator housing to the rigid support structure is typically sufficient.

Notwithstanding the above description, certain air flow control configurations, do, in fact, rely upon the actuator to provide a bearing position for, and otherwise support, the output shaft. For example, the output shaft may be configured as a threaded rod to maintain the damper blade. With this arrangement, rotation of the output shaft causes the damper blade to maneuver along an axis of the output shaft. The actuator, in turn, is required to not only impart a rotational torque onto the output shaft, but also to support an axial position for, and resist axial movement of, the output shaft. In this regard, use of a single bolt to secure the actuator housing to the rigid support structure associated with the air flow control unit will not provide requisite support. The single bolt coupling will likely fail when a force or load normal to the actuator housing is generated by the output shaft. Additionally, even with "standard" air flow control applications, the installer may desire to provide a more rigid connection between the actuator housing and the support structure in question.

One potential solution to the above-described installation issue is to use four or more bolts to secure the actuator housing to the rigid support structure. Unfortunately, this approach is relatively time consuming. Additionally, in light of the forces potentially placed upon the actuator housing, it may be that use of four or more bolts will not satisfy the force constraints placed on the actuator. Further, because the actuator housing and bolts are made of steel, any vibration of the actuator housing relative to the bolts will generate a substantial amount of noise.

Direct coupled actuators continue to be extremely popular commercial damper control devices. However, with certain applications, the generally accepted technique of mounting the actuator housing to a support structure with a single bolt may not provide a sufficiently rigid connection. Further, the use of additional bolts is time consuming and may not satisfy the output shaft positioning and load concerns presented by a particular application. Therefore, a need exists for an actuator mounting device for facilitating rapid mounting of the actuator and resulting in a more complete coupling between the actuator and the support structure associated with the air flow control unit.

SUMMARY OF THE INVENTION

One aspect of the present invention provides an actuator mounting device for mounting an actuator having an actuator housing to a support structure associated with a fluid flow control unit. The mounting device includes a mounting bracket and a pair of guide members. The mounting bracket includes a pair of spaced side walls, the rails and a stop. The pair of spaced side walls define a leading end and a trailing end. Further, each of the side walls has a base portion securable to a support structure associated with the fluid flow control unit. A separate one of the rails extends from each side wall. Finally, the stop is associated with the trailing end of the pair of spaced side walls. The pair of guide members are each mountable to an opposing side of an actuator housing. Each of the guide members includes a bearing surface configured to slidably engage a respective one of the rails. During assembly, the rails direct the actuator, via the guide members, to a secured position at which the stop limits further movement of the actuator housing. The sliding relationship between the guide members and rails facilitates rapid mounting of the actuator to the support structure. Further, in the secured position, the mounting device rigidly connects the actuator to the support structure via an interface between the rails and guide members.

Another aspect of the present invention provides an improved direct coupled actuator. The actuator includes an actuator housing maintaining a rotatable hub for connection to an output shaft of a fluid flow control unit and a motor for driving the hub. The actuator housing includes opposing sides. With this configuration in mind, the improvement comprises a first guide member mounted to a first one of the opposing sides, and a second guide member mounted to a second one of the opposing sides. Each of the guide members includes a pair of spaced legs defining an elongated slot. The elongated slot is configured to slidably engage a portion of a support structure associated with a fluid flow control unit. In this regard, the guide members facilitate rapid mounting of the actuator to the support structure via a sliding relationship. Additionally, upon final assembly, the guide members rigidly secure the actuator housing to the support structure such that the actuator housing supports forces generated by the output shaft.

Yet another aspect of the present invention relates to a method of mounting an actuator to a support structure associated with a fluid flow control unit. The actuator includes an actuator housing having opposing sides. The method includes securing a first guide member to a first one of the opposing sides. A second guide member is secured to a second one of the opposing sides. In this regard, each of the guide members provides an elongated engagement surface defined by a first end and a second end. A mounting bracket is attached to a support structure associated with a fluid flow control unit. The mounting bracket includes a pair of spaced side walls defining a leading end and a trailing end. A separate rail extends from each side wall. Finally, a stop is positioned adjacent the trailing end. The method includes positioning the actuator housing relative to the mounting bracket such that the first end of each of the engagement surfaces is aligned with a respective one of the rails at the leading end of the mounting bracket. The engagement surfaces are slid along the rails such that the first ends of the engagement surfaces are maneuvered toward the trailing end of the mounting bracket. As a result of this sliding motion, the actuator housing is directed into connection with the stop.

DETAILED DESCRIPTION OF THE PREFERRED EMBODIMENTS

Figure 1:
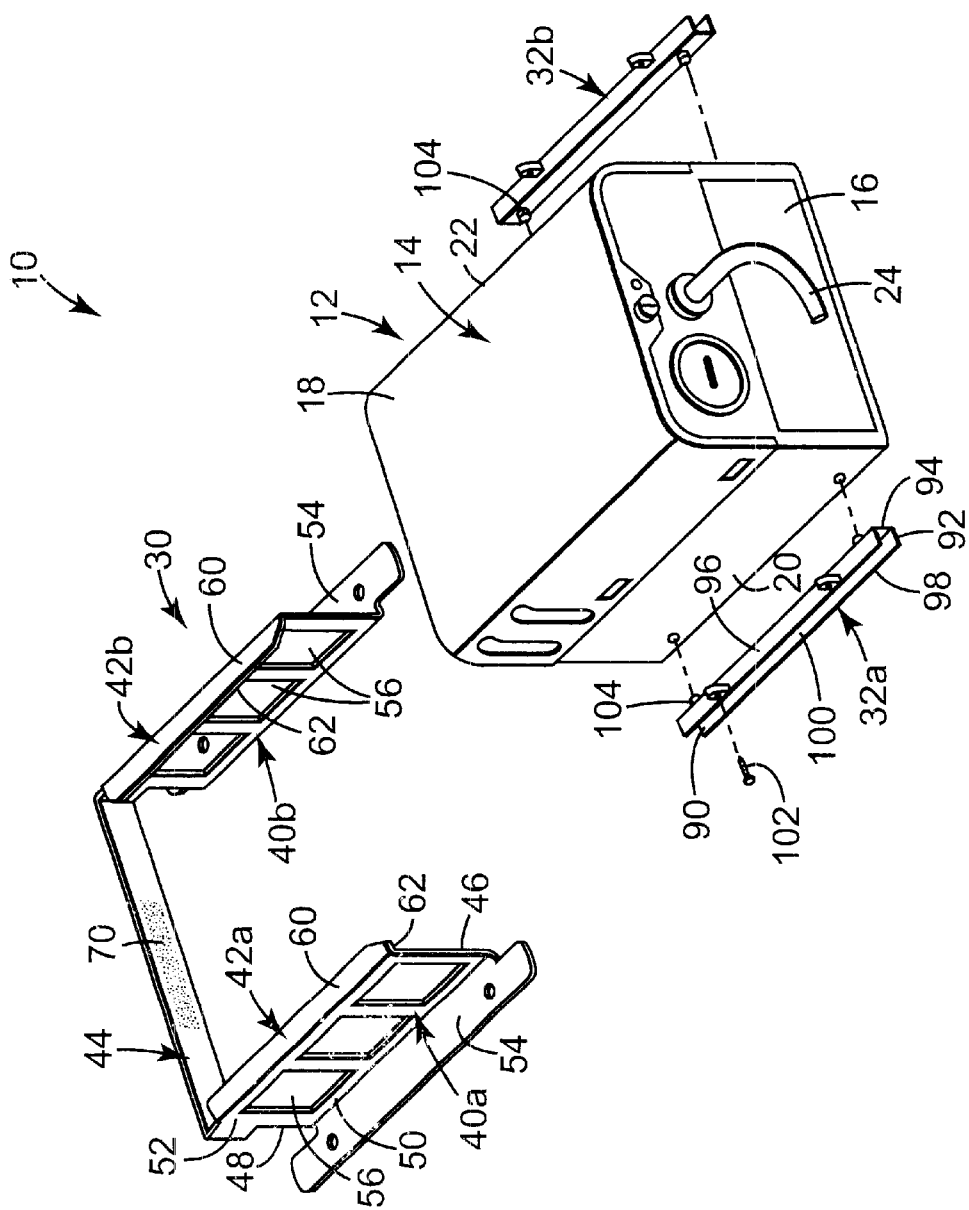
FIG. 1 is an exploded, perspective view of an actuator mounting device in accordance with the present invention assembled to an actuator.

One preferred embodiment of an actuator mounting device 10 is shown in FIG. 1. As a point of reference, actuator mounting device 10 is shown in conjunction with a direct coupled actuator 12. Direct coupled actuator 12 is of a type commonly known in the art and generally includes an actuator housing 14. Actuator housing 14 maintains a hub (not shown) rotatably driven by a motor (not shown). Actuator housing 14 is generally defined by a front 16, a back 18 (shown partially in FIG. 1), a left side 20 and a right side 22 (shown partially in FIG. 1). As used throughout this specification, directional terminology such as "front," "back," "left," "right," "upper" and "lower" are with reference to a particular figure being described and are used for purposes of clarity only. Actuator 12 and actuator mounting device 10 may actually be orientated in any direction. As such, these terms are not meant to serve as limitations. Actuator 12 may further include additional components, including an electrical lead 24 for powering the motor. In response to various electrical signals, the motor causes the hub to rotate to a desired position or a desired number of revolutions. Suitable direct coupled actuators are readily available, for example, from Honeywell Inc. of Minneapolis, Minn.

Actuator mounting device 10 is comprised of a mounting bracket 30 and a pair of guide members 32a, 32b. In general terms, mounting bracket 30 is configured to slidably receive guide members 32a, 32b. Thus, where mounting bracket 30 is secured to a support structure (not shown) and guide members 32a, 32b are secured to actuator housing 14, mounting device 10 facilitates mounting of actuator 12 to the support structure.

Mounting bracket 30 includes a pair of spaced side walls 40a, 40b, a rail 42a, 42b associated with each side wall 40a, 40b and a stop 44. In a preferred embodiment, mounting bracket 30 is integrally formed from a rigid material, such as galvanized sheet metal.

Side walls 40a, 40b are preferably identical, each defining a leading end 46, a trailing end 48, a base 50 and a top 52. For ease of illustration, FIG. 1 identifies these portions for side wall 40a, it being understood that side wall 40b can be similarly referenced. Bottom 50 is configured for attachment to a support structure (not shown). To this end, in one preferred embodiment, base 50 forms a foot 54. Foot 54 is sized to provide sufficient surface area for attaching respective side wall 40a, 40b to the support structure via bolts (not shown). Alternatively, base 50 may be welded, riveted, etc. to the support structure. As shown in FIG. 1, each side wall 40a, 40b preferably is formed to include passages 56. Passages 56 are provided to enhance air flow through mounting device 10. However, passages 56 are not required for proper functioning of mounting bracket 30.

As described in greater detail below, spacing between side walls 40a, 40b is dependent upon a size of actuator housing 14 in conjunction with dimensions of rails 42a, 42b.

Rails 42a, 42b are preferably identical, extending from a respective side wall 40a, 40b. Each rail 42a, 42b forms an upper bearing surface 60 and a lower bearing surface 62 (shown partially in FIG. 1). As described below, upper bearing surface 60 and lower bearing surface 62 are configured to abut with a portion of guide members 32a, 32b, respectively, for supporting actuator housing 14.

Each rail 42a, 42b preferably extends from top 52 of respective side wall 40a, 40b in a substantially perpendicular fashion. Alternatively, rail 42a, 42b may extend from any other portion of respective side wall 40a, 40b and may extend at an angle. Rails 42a, 42b preferably extend in the same plane although rails 42a, 42b may be offset such that, for example, rail 42a projects from top 52 of side wall 40a, whereas rail 42b projects from a middle of side wall 40b. As shown in FIG. 1, each rail 42a, 42b is preferably continuous from leading end 46 to trailing end 48. Alternatively, rail 42a, 42b may have a length less than that of side wall 40a, 40b, respectively, or may extend beyond leading end 46. Preferably, however, the length of each rail 42a, 42b corresponds with a length of guide members 32a, 32b.

Each rail 42a, 42b preferably extends inwardly relative to spaced side walls 40a, 40b. For example, rail 42a extends from side wall 40a toward opposing side wall 40b. Similarly, rail 42b extends from side wall 40b towards opposing side wall 40a. Alternatively, rails 42a, 42b may be configured to extend outwardly relative to the respective side wall 40a, 40b. As described in greater detail below, inward extension (or width) of each rail 42a, 42b corresponds with a related dimension of guide members 32a, 32b. In one preferred embodiment, however, each rail 42a, 42b has a width (or inward extension from side wall 40a, 40b, respectively) of approximately 0.25 inch. Other dimensions, either greater or smaller, may also be acceptable. As previously indicated, extension of rails 42a, 42b dictates a desired spacing between side walls 40a, 40b. In this regard, a final spacing between rails 42a, 42b approximates a dimension of actuator housing 14. For example, with respect to the preferred embodiment of FIG. 1, where guide members 32a, 32b are secured to left side 20 and right side 22, respectively, spacing between rails 42a, 42b is approximately equal to a width of actuator housing 14 (or distance between left side 20 and right side 22). Alternatively, where guide members 32a, 32b are configured for attachment to front 16 and back 18 of actuator housing 14, spacing between rails 42a, 42b approximates a length of actuator housing 14.

Figure 2:
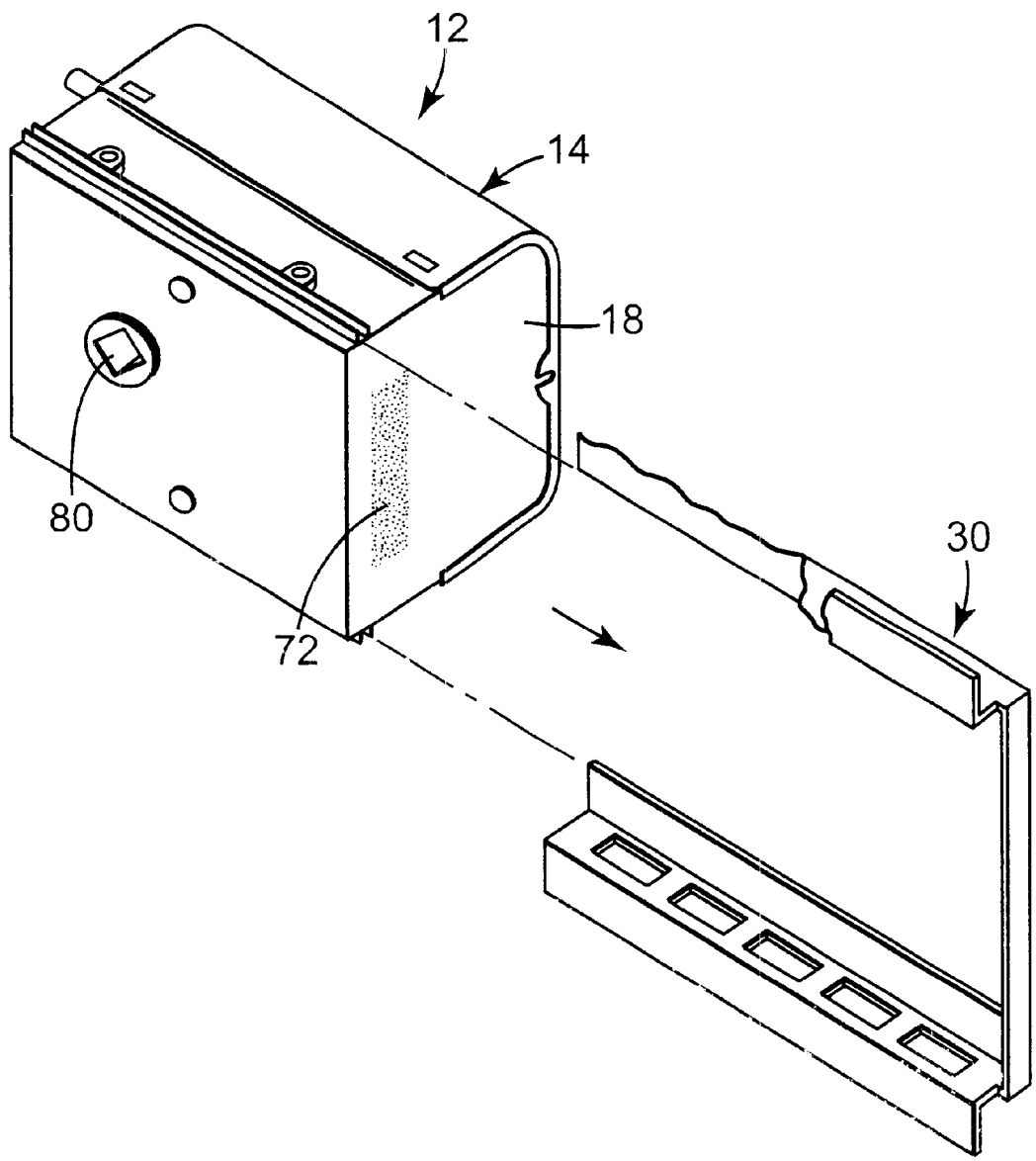
FIG. 2 is a rear perspective view of the actuator mounting device of FIG. 1, including an actuator.

Stop 44 is preferably a cross bar extending between side walls 40a, 40b at trailing end 48. Alternatively, stop 44 may be a tab extending from trailing end 48 of each of side walls 40a, 40b. Regardless of the exact configuration, stop 44 is positioned to abut with a portion of actuator housing 14 upon final assembly. To this end, in one preferred embodiment, stop 44 further includes a securing means 70 for capturing actuator housing 14 to stop 44. For example, in one preferred embodiment, securing means 70 is a hook-and-loop material, such as Velcro®, secured to an interior surface of stop 44. With this preferred embodiment, as shown in FIG. 2, a reciprocal hook-and-loop 72 material is disposed along a portion of actuator housing 14, such as back 18. As a point of reference, FIG. 2 depicts hub 80 associated with actuator 12. Securing means 70 may assume a wide variety of other forms, including an adhesive, mechanical fastener, etc.

Returning to FIG. 1, guide members 32a, 32b are configured for attachment to opposing sides of actuator housing 14. For example, guide member 32a is configured to be attached to left side 20 of actuator housing 14; whereas guide member 32b is configured for attachment to right side 22 of actuator housing 14. Guide members 32a, 32b are preferably identical for common usage with actuator housing 14 such that guide member 32a can be attached to right side 22, and guide member 32b attached to left side 20. Alternatively, guide members 32a, 32b may be sized for assembly to front 16 and back 18, respectively. In other words, front 16 and back 18 also constitute opposing sides of actuator housing 14. Regardless of exact placement, guide members 32a, 32b are preferably identical. Thus, only one guide member 32a is described in detail, it being understood that other guide member 32b is substantially similar. Guide member 32a defines a first end 90 and a second end 92, and includes a base 94, a first leg 96 and a second leg 98. First leg 96 and second leg 98 extend from base 94 and define an elongated slot 100. Elongated slot 100 preferably has a height slightly greater than a height of rail 42a such that rail 42a easily slides within slot 100, and selectively engages surfaces of first leg 96 and second leg 98. As shown in FIG. 1, first leg 96 and second leg 98 are tapered at both first end 90 and second end 92. Thus, in a preferred embodiment, elongated slot 100 is slightly enlarged at first end 90 and second end 92. As described in greater detail below, this configuration facilitates assembly of guide members 32a, 32b over rails 42a, 42b, respectively.

In a preferred embodiment, each of guide members 32a, 32b are integrally formed from a polymer material. For example, guide members 32a, 32b may be formed from a relatively rigid plastic such as nylon or similar material. Alternatively, guide members 32a, 32b may be constructed from an elastomer such as rubber. Even further, guide members 32a, 32b may be formed from any other relatively rigid material, such as galvanized sheet metal.

Figure 3:
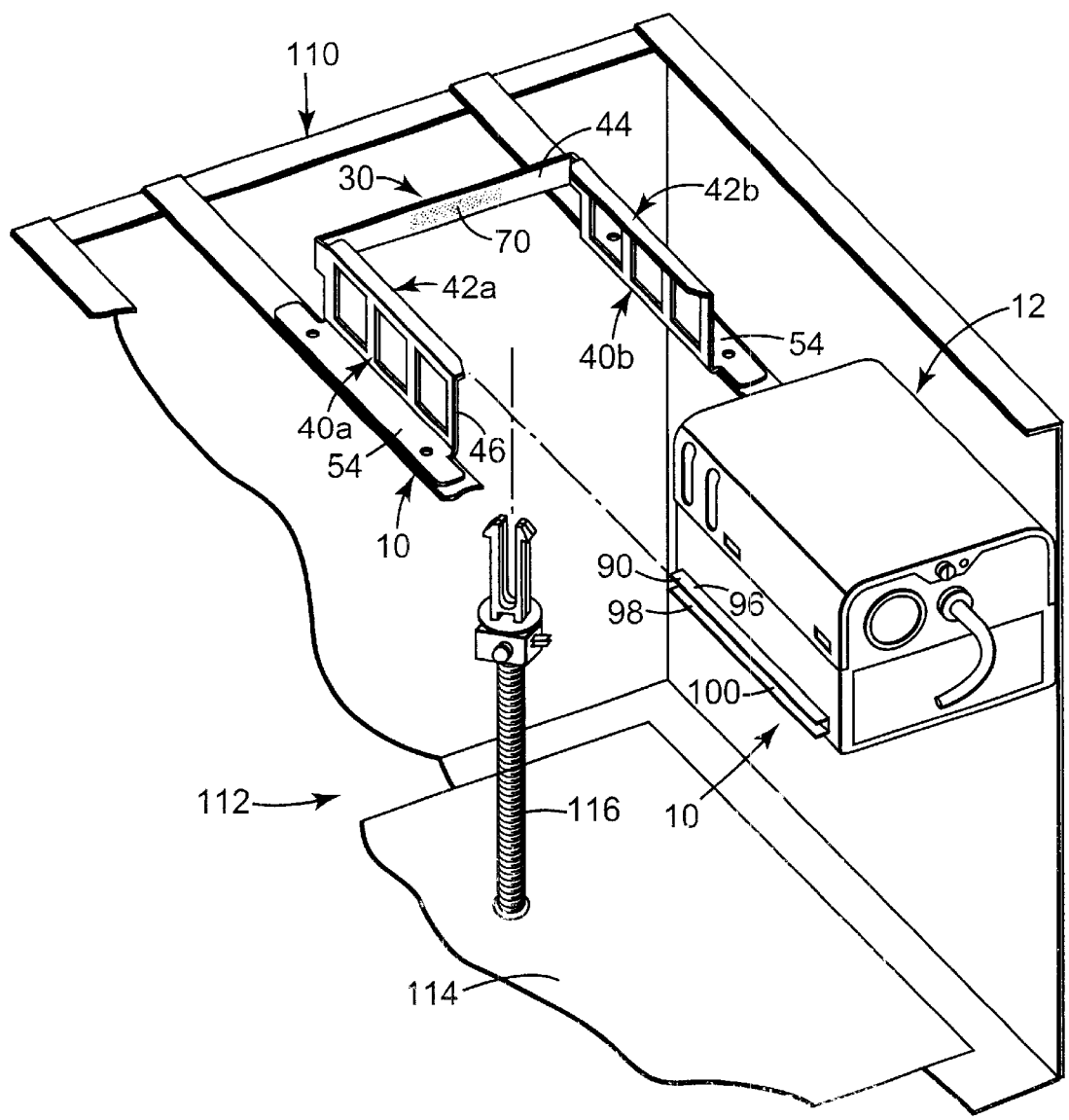
FIG. 3 is an exploded view of the actuator mounting device of FIG. 1 assembling an actuator to a support structure associated with an air flow control unit.

Mounting of direct coupled actuator 12 with actuator mounting device 10 begins with assembly of guide members 32a, 32b to actuator housing 14. For example, as shown in FIG. 1, guide member 32a is assembled to left side 20 and guide member 32b is assembled to right side 22. Coupling of guide members 32a, 32b to actuator housing 14 may be accomplished via screws 102, frictional fit pins 104, adhesives, or any other generally accepted mounting technique. As previously indicated, guide members 32a, 32b may alternatively be assembled to front 16 and back 18. Mounting bracket 30 is then assembled to a rigid support structure 110 as shown in FIG. 3. Rigid support structure 110 is preferably associated with a fluid flow control unit, for example a damper configuration 112 (shown with portions cutaway in FIG. 3). Damper 112 includes a damper blade 114 and an output shaft 116. It should be understood that damper 112 shown in FIG. 3 is but one of many different available air flow control units. For example, damper blade 114 need not necessarily be directly connected to output shaft 116. Further, rigid support structure 110 can be associated with damper 112 in a number of different manners. For example, support structure 110 may be a frame formed along a side of damper 112. Alternatively, support structure 110 may be auxiliary duct work, continuous wall, a storage tank housing, facility structural beams, etc. located adjacent damper 112. Thus, support structure 110 need not necessarily be an integral part of damper 112. Regardless of exact configuration of support structure 110, mounting bracket 30 is secured to a portion of support structure 110. For example, in the embodiment of FIG. 3, support structure 110 is a frame to which foot 54 of each of side walls 40a, 40b is welded. Alternatively, mounting bracket 30 may be secured to support structure 110 with an adhesive, bolts, or other mechanical fasteners.

Actuator 12 is then positioned adjacent mounting bracket 30 such that first ends 90 of guide members 32a, 32b are aligned with respective rails 42a, 42b at leading end 46 of mounting bracket 30. In particular, first end 90 of guide member 32a is aligned with leading end 46 of rail 42a; whereas first end 90 of guide member 32b is aligned with leading end 46 of rail 42b. Actuator 12 is maneuvered toward stop 52 such that rail 42a is engaged within slot 100 of guide member 32a and rail 42b is engaged within slot 100 of guide member 32b. In this regard, the preferred taper of legs 96, 98 at first end 90 facilitates initial engagement of rail 42a, 42b within slot 100, respectively.

Actuator 12 is further maneuvered toward stop 44, with guide members 32a, 32b sliding along rails 42a, 42b, respectively. Essentially, rails 42a, 42b direct actuator 12, via guide members 32a, 32b, toward stop 44 until a portion of actuator housing 14 contacts, or is otherwise connected to, stop 44. Stop 44 prevents further movement of actuator housing 14. In one preferred embodiment, where stop 44 includes securing means 70, actuator housing 14 is secured to mounting bracket 30 at stop 44. Thus, securing means 70 prevents movement of actuator housing 14 away from stop 44. For example, securing means 70 may be a hook-and-loop material that engages with a corresponding hook-and-loop material 72 (FIG. 2) disposed on back 18 of actuator housing 14. Alternatively, a mechanical pin stop or similar fastener may be employed. Even further, actuator housing 14 may be orientated relative to damper 112 such that gravity maintains actuator housing 112 against stop 44.

Figure 4:
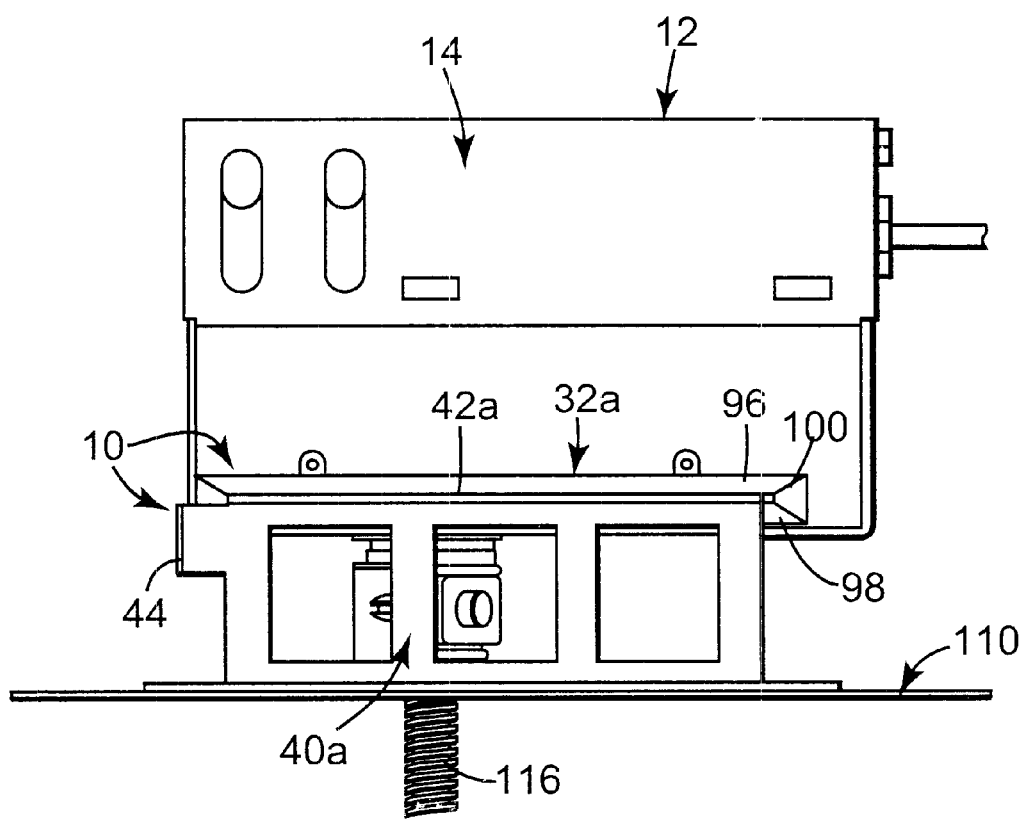
FIG. 4 is a side view of an actuator mounted to a support structure by the actuator mounting device of FIG. 1.

Output shaft 116 is then coupled to hub 80 (FIG. 2). Once coupled, actuator 12 is electrically connected to a power supply (not shown) and is available for controlling output shaft 116, which in turn dictates position of damper blade 114. As a point of reference, FIG. 4 depicts one of guide member 32a and a related portion of mounting bracket 30. Relationship of guide member 32b relative to mounting bracket 30 is preferably identical.

During operation of actuator 12, actuator mounting device 10 facilitates actuator 12 serving as a bearing position and support for output shaft 116. For example, depending upon the particular damper application, output shaft 116 may impart an axial load (vertical direction in FIG. 4) onto actuator 12. Actuator housing 14 provides a requisite resistance to this force via actuator mounting device 10. In other words, with respect to the orientation of FIG. 4, actuator housing 14 resists an upward and/or downward force generated by output shaft 116. For example, an upward force generated by output shaft 116 may be imparted onto actuator 12. Actuator housing 14, due to coupling with output shaft 116, is subjected to an identical upward force. However, interface between second leg 98 of guide member 32a with lower bearing surface 62 of rail 42a prevents actuator housing 14 from moving away from support structure 110. As a result, actuator housing 14 provides a requisite support to the upward force generated by output shaft 116. Essentially, second leg 98 provides an engagement surface that engages lower bearing surface 62 of rail 42a in response to an upward force generated by output shaft 116. Conversely, a downward force generated by output shaft 116 is supported via interaction between first leg 96 of guide member 32a, with upper bearing surface 60 of rail 42a. Finally, securing means 70 (FIG. 3) prevents movement of actuator 12 away from stop 44 in response to a twisting or radial load (horizontal direction of FIG. 4) generated by output shaft 116. In one preferred embodiment, to facilitate rapid sliding of guide members 32a, 32b over rails 42a, 42b, each rail 42a, 42b has a height slightly less than a height of respective slot 100. Thus, a clearance fit is preferably created between rails 42a, 42b and guide members 32a, 32b, as opposed to an interference fit. As a result, it is possible that cycling of actuator 12 may cause each guide member 32a, 32b to vibrate slightly relative to rails 42a, 42b, respectively. By utilizing a plastic or rubber material for guide members 32a, 32b, any potential noise generated by this vibration is minimized. Further, because guide members 32a, 32b are relatively small, only a very minimal amount of plastic or rubber is introduced into the air flow. Thus, plastic or rubber guide members 32a, 32b do not present a smoke or fire hazard. This same beneficial result can be achieved by employing a plastic or rubber material for rails 42a, 42b and sheet metal or steel for guide members 32a, 32b.

Notably, while mounting device 10 has been preferably described as having a slot formed in each guide member for slidably receiving a respective rail associated with a mounting bracket, this configuration can be reversed. In other words, the mounting bracket may be configured to form an opposing pair of slots; whereas the guide members each assume a singular track configuration. With this approach, each guide member (or track) will be slidably received within a respective slot associated with the mounting bracket.

The actuator mounting device of the present invention provides for rapid assembly of an actuator to a support structure associated with a fluid flow control unit. In particular, the guide members otherwise assembled to the actuator housing are simply slid into engagement with respective rails associated with the mounting bracket. Where the support structure associated with the fluid flow control unit is manufactured to include an appropriate mounting bracket, final installation of the actuator occurs in a highly expedited manner. Further, upon final assembly, due to the preferred extension of the guide members along an entire length or width of the actuator housing, an enlarged interface surface area is provided such that the actuator housing, via the actuator mounting device, provides requisite support to forces generated by an output shaft.

Although the present invention has been described with reference to preferred embodiments, workers skilled in the art will recognize that changes may be made in form and detail without departing from the spirit and scope of the present invention. For example, the actuator mounting device has been described in conjunction with an air flow control damper. Alternatively, the actuator mounting device will perform equally as well for mounting a liquid flow control device, such as a ball valve. Further, the mounting bracket has been shown as being provided separately from the rigid support structure associated with the fluid flow control unit (or damper). Alternatively, the fluid flow control unit may be provided to a user with the mounting bracket previously installed. Additionally, while the mounting bracket has been described as preferably including a securing means, the securing means is not a necessary element. Instead, the particular air flow control application may be such that side-to-side movement of the output shaft is not a concern. Under these circumstances, the securing means will not be required. Finally, the mounting bracket has been described as being an integral component. Alternatively, however, the side walls may be manufactured and installed individually.

What is claimed is:

1. An actuator mounting device for mounting an actuator having an actuator housing to a support structure associated with a fluid flow control unit, said actuator mounting device comprising:

a mounting bracket comprising:
a pair of spaced side walls defining a leading end and a trailing end, each of said side walls having a base portion securable to a support structure associated with a fluid flow control unit,
a rail extending from each side wall, respectively,
a stop integrally formed at said trailing end; and
a pair of guide members each mountable to an opposing side of an actuator housing, each of said guide members including an engagement surface configured to slidably engage one of said rails, respectively;
wherein said rails direct said guide members to a secured position at which said stop limits sliding movement of the actuator housing.

2. The actuator mounting device of claim 1, wherein each of said rails extends inwardly relative to said pair of spaced side walls.

3. The actuator mounting device of claim 1, wherein each of said rails extends in a plane substantially perpendicular to said side wall, respectively.

4. The actuator mounting device of claim 1, wherein said side walls each include an air flow passage.

5. The actuator mounting device of claim 1, further including:

securing means for securing the actuator housing to said stop.

6. The actuator mounting device of claim 1, wherein each of said guide members are configured to form a clearance fit with one of said rails, respectively.

7. The actuator mounting device of claim 1, wherein said guide members are identical.

8. The actuator mounting device of claim 1, wherein each of said guide members includes spaced legs defining an elongated slot sized to slidably engage a respective one of said rails.

9. The actuator mounting device of claim 8, wherein said guide members each define a first end and a second end, each of said slots being enlarged at said first end to facilitate engagement of said rail within said slot, respectively.

10. The actuator mounting device of claim 1, wherein said guide members are made of a relatively rigid polymer for reducing noise.

11. An improved direct coupled actuator including an actuator housing directly maintaining a rotatable hub for connection to an output shaft of a fluid flow control unit and a motor for driving said hub, said actuator housing including opposing sides, the improvement comprising:

a first guide member mounted to a first one of said opposing sides; and a second guide member mounted to a second one of said opposing sides;

wherein each of said guide members includes a pair of spaced legs defining an elongated slot configured to slidably engage a respective rail portion of a support structure associated with a fluid flow control unit and align said hub with said output shaft.

12. The improved actuator of claim 11, wherein said actuator housing includes a front, a back, a left side and a right side, said first guide member being mounted to said left side and said second guide member being mounted to said right side.

13. The improved actuator of claim 11, wherein each of said guide members are made of a relatively rigid polymer.

14. The improved actuator of claim 11, wherein each of said slots extends in a plane substantially perpendicular to an axis defined by said hub.

15. The improved actuator of claim 11, wherein each of said guide members define a first end and a second end, each of said slots having an increased height at said first end.

16. The improved actuator of claim 11, wherein said guide members are identical.

17. A method of mounting an actuator to a support structure associated with a fluid flow control unit, said actuator including an actuator housing having opposing sides, the method including:

securing a first guide member to a first one of said opposing sides;

securing a second guide member to a second one of said opposing sides, wherein each of said guide members provides an elongated engagement surface defined by a first end and a second end;

providing a mounting bracket attached to a support structure associated with a fluid flow control unit, said mounting bracket including a pair of spaced side walls defining a leading end and a trailing end, a rail extending from each side wall, and a stop located adjacent said trailing end;

positioning said actuator housing such that said first end of each of said engagement surfaces is aligned with a respective one of said rails at said leading end; and sliding said engagement surfaces along said rails such that said first ends move towards said trailing end, thereby directing said actuator housing into connection with said stop.

18. The method of claim 17, wherein each of said guide members includes a pair of spaced legs defining a slot, each of said legs forming an engagement surface, and further wherein positioning said actuator housing includes:

placing each of said rails within a respective one of said slots.

19. The method of claim 17, wherein each of said rails includes a pair of spaced legs defining a slot, and each of said guide members forms an elongated track, and further wherein positioning said actuator housing includes:

placing each of said tracks within a respective one of said slots.

* * * * *